May 31, 1949.  E. W. WETZEL  2,472,033

SPORTSMAN'S HAT

Filed Feb. 24, 1947

INVENTOR.
Earl W. Wetzel
BY
Morsell & Morsell
ATTORNEYS.

Patented May 31, 1949

2,472,033

UNITED STATES PATENT OFFICE 2,472,033

SPORTSMAN'S HAT

Earl W. Wetzel, Milwaukee, Wis.

Application February 24, 1947, Serial No. 730,373

7 Claims. (Cl. 2—4)

1

This invention relates to improvements in sportsmens' hats.

Sportsmen, in pursuing the sport of their choice, often frequent regions which are infested with mosquitoes, flies or other obnoxious and possibly poisonous insects. To protect themselves, resort has been had to unpleasant insect repellants which are applied to the exposed portions of the sportsmens' face and neck, or to cumbersome head coverings, which must be carried in addition to other equipment, for use in place of or in conjunction with the conventional sportsman's hat.

It is a general object of the present invention to provide a sportsman's hat, closely resembling a conventional hat, which is equipped with netting so arranged that the hat may be quickly converted from conventional form to a form in which the user is protected from insects.

A further object of the present invention is to provide a convertible sportsman's hat having a self contained insect shield connected to the brim thereof which, when not in use, may be quickly rolled or folded so as to be out of sight.

A further object of the present invention is to provide a sportsman's hat having two brims in spaced relation and so arranged that insect netting connected to one of said brims may, when not in use, be disposed within the space between said brims and be releasably held within said space.

With these and other objects in view, the invention consists of the improved sportsman's hat, and all its parts and combinations, as set forth in the claims, and all equivalents thereof.

In the accompanying drawings illustrating one complete embodiment of the preferred form of the invention, in which the same reference numerals designate the same parts in all of the views.

2

Figure 1:
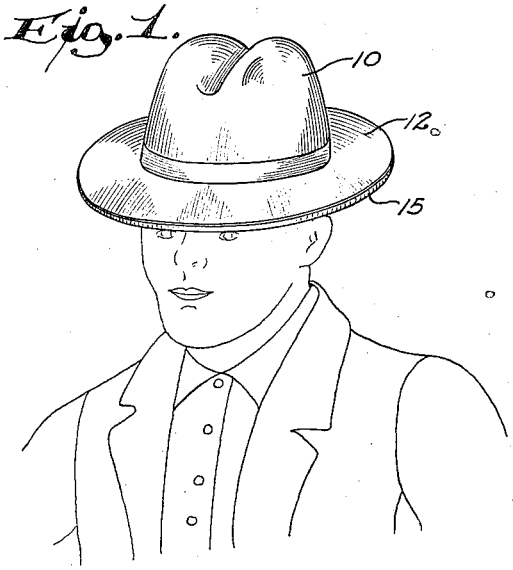
Fig. 1 is a perspective view of the improved sportsman's hat with the insect net in concealed position.
Figure 2:
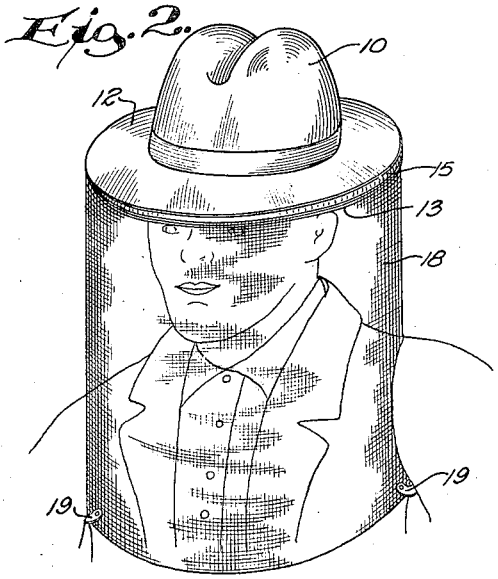
Fig. 2 is a perspective view of the improved sportsman's hat with the insect net depending from the brim thereof in a position of use.
Figure 3:
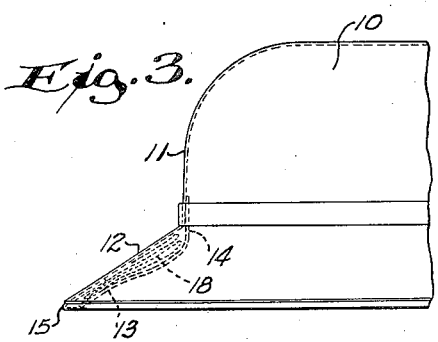
Fig. 3 is a fragmentary side view of the improved hat with the insect net in concealed position.
Figure 4:
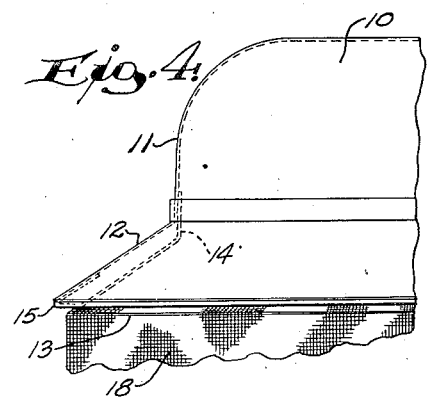
Fig. 4 is a fragmentary side view of the improved hat with the insect net depending from the brim thereof.
Figure 5:
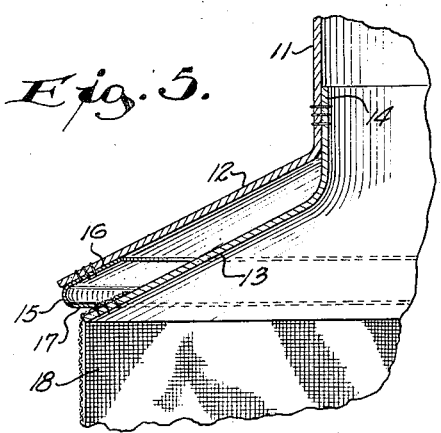
Fig. 5 is an enlarged fragmentary vertical sectional view of the improved hat with the insect net depending from the brim thereof.
Figure 6:
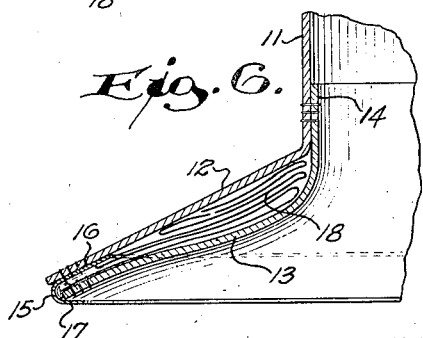

Fig. 6 is an enlarged fragmentary vertical sectional view of the improved hat with the insect net in concealed position.

Referring more particularly to the drawing, there is a hat 10, of generally conventional shape made of felt, braided straw, or other material suitable for the purpose described. The hat 10 has a brim 12 extending from the lower peripheral portion of the crown 11 thereof. A supplementary brim 13, preferably of a size and material similar to that of the brim 12, is formed with an upstanding annular band 14 extending from the inner peripheral portion thereof. The band 14 is secured by sewing or other suitable means to the interior of the crown 11 near the lower peripheral portion thereof, in such a way that the brims 12 and 13 are in spaced relationship (preferably with a spacing of about one-half an inch) at the inner portions thereof to provide a pocket.

Secured to the outer peripheral portion of the brim 12 by sewing or other suitable means is an annular retainer 15 of relatively thin and generally U-shaped cross-section. The retainer 15 is preferably made of plastic or other suitable material and consists of an upper inwardly extending flange 16 and a lower inwardly extending flange 17. The upper flange 16, which is of greater length, is secured to the underside of the brim 12 at the outer edge thereof in such a way that the retainer 15 preferably presents a rounded outer edge.

Sewn preferably to the upper side of the brim 13 at the outer edge thereof is an insect shield or screen 18 of generally cylindrical shape and made of any suitable material such as conventional cloth mosquito netting. The screen 18, when in use, depends from the edge of the brim 13 to protect the head and neck of the wearer from insects. As a further protection, a pair of under-arm bands 19 may be attached to opposite sides of the lower edge of the screen 18 to render it difficult for insects to enter the interior of the screen 18 from below.

When the screen 18 is not in use, it may be rolled up or folded and tucked into the space between the brims 12 and 13, as is most clearly shown in Fig. 6. The outer edge of the lower brim 13 is then snapped into place above the lower flange 17 of the retainer 15 as is shown in Fig. 6, presenting the appearance of a hat having only a single brim.

The improved sportsman's hat provides a convenient, neat appearing hat having an efficient insect screen incorporated therein wherein said screen may be quickly and easily converted from a position of use to a retracted position. The hat is simple in construction, easy to manufacture, and is in all respects well adapted for the purpose described.

Although only one form of the invention has been shown and described, various changes and modifications and adaptations may be made without departing from the spirit of the invention. For example, the invention is particularly well adapted for use in sun helmets which are so often worn in the tropics and in insect infested jungles. All such changes are contemplated which may come within the scope of the claims.

What I claim is:

1. In a hat having a brim, reticulated material connected to said brim and having a portion adapted to be suspended therefrom to form an insect screen, and pocket means associated with said brim for receiving said reticulated material and for maintaining said reticulated material in a concealed position when not in use as a screen.

2. In a hat having a first brim, a second brim spaced below said first brim to form a pocket therebetween, reticulated material connected to one of said brims and having a portion adapted to be suspended therefrom to form an insect screen, and releasable means for maintaining said reticulated material concealed in said pocket when not in use as a screen.

3. In a hat having a first brim, a second brim spaced below said first brim to form a pocket therebetween, and reticulated material connected to one of said brims and having a portion adapted to be suspended therefrom to form an insect screen, said pocket being adapted to accommodate said reticulated material when the latter is not in use as a screen.

4. In a hat having a first brim, a second brim spaced below said first brim to form a pocket therebetween, reticulated material connected to one of said brims and having a portion adapted to be suspended therefrom to form an insect screen, and releasable means connected to one of said brims and coacting with the other of said brims to maintain said reticulated material concealed in said pocket when not in use as a screen.

5. In a hat having a first brim, a second brim spaced below said first brim to form a pocket therebetween, reticulated material connected to one of said brims and having a portion adapted to be suspended therefrom to form an insect screen, and releasable means for maintaining the outer edges of said brims in juxtaposition whereby said reticulated material may be concealed in said pocket when not in use as a screen.

6. In a hat having a first brim, a second brim spaced below said first brim to form a pocket therebetween, reticulated material connected to one of said brims and having a portion adapted to be suspended therefrom to form an insect screen, and an annular retainer connected to the outer edge of one of said brims, said retainer having an inwardly extending flange for releasably maintaining the outer edges of said brims in juxtaposition whereby said reticulated material may be concealed in said pocket when not in use as a screen.

7. In a hat having a first brim, a second brim spaced below said first brim to form a pocket therebetween, a tube of reticulated material connected at its upper edge to one of said brims and adapted to be suspended therefrom to form an insect screen, and releasable means connected to one of said brims and coacting with the other of said brims to maintain said reticulated material concealed in said pocket when not in use as a screen.

EARL W. WETZEL.

REFERENCES CITED

The following references are of record in the file of this patent:

UNITED STATES PATENTS

| Number | Name | Date |
|---|---|---|
| 1,238,966 | Vaughan | Sept. 4, 1917 |
| 1,780,801 | Shlenker | Nov. 4, 1930 |